(12) United States Patent
Blottiau et al.

(10) Patent No.: US 11,639,086 B2
(45) Date of Patent: May 2, 2023

(54) VEHICLE DOOR OF THE FLUSH TYPE

(71) Applicant: HUTCHINSON, Paris (FR)

(72) Inventors: Olivier Blottiau, Cepoy (FR); Cyril Lajoux, Vimory (FR)

(73) Assignee: HUTCHINSON, Paris (FR)

( * ) Notice: Subject to any disclaimer, the term of this patent is extended or adjusted under 35 U.S.C. 154(b) by 626 days.

(21) Appl. No.: 16/708,071

(22) Filed: Dec. 9, 2019

(65) Prior Publication Data

US 2020/0180405 A1 Jun. 11, 2020

(30) Foreign Application Priority Data

Dec. 10, 2018 (FR) ..................................... 1872637

(51) Int. Cl.
*B60J 1/00* (2006.01)
*B60J 1/17* (2006.01)
(Continued)

(52) U.S. Cl.
CPC .................. *B60J 1/007* (2013.01); *B60J 1/12* (2013.01); *B60J 1/17* (2013.01); *B60J 5/04* (2013.01);
(Continued)

(58) Field of Classification Search
CPC ... B60J 1/004; B60J 1/006; B60J 1/007; B60J 1/08; B60J 1/10; B60J 1/12; B60J 1/16; B60J 1/17; B60J 10/00; B60J 10/30; B60J 10/32; B60J 10/45; B60J 10/70; B60J 10/74; B60J 10/78; B60J 10/79; B60J 10/80; B60J 10/84; B60J 10/86; B60J 10/88; B60J 5/04; B60J 5/0401; B60J 5/0402; B60J 5/0406; B60J 5/0412; B60J 5/0419
(Continued)

(56) References Cited

U.S. PATENT DOCUMENTS 4,653,230 A 3/1987 Seo et al.
5,199,761 A 4/1993 Dannecker et al.
(Continued)

FOREIGN PATENT DOCUMENTS

CA 2983661 A1 11/2016
DE 102017004131 A1 10/2018
(Continued)

OTHER PUBLICATIONS

Burguet et al., "Sealing Module for a Fixed Window Intended to Be Mounted on a Door of a Vehicle", Feb. 25, 2005, Publisher: European Patent Office, Edition: FR2858950A1 (Year: 2005).*
(Continued)

*Primary Examiner* — Dennis H Pedder
*Assistant Examiner* — Joyce Eileen Hill
(74) *Attorney, Agent, or Firm* — Christensen O'Connor Johnson Kindness PLLC

(57) ABSTRACT

A vehicle door comprising a mount, a encapsulated fixed window module, a movable window, and a sliding joint, the windows comprising outer surfaces which are aligned with each other as well as with an outer surface of a first trim attached to the first ascending strand and fixed to the first ascending post, and an outer surface of a second trim attached to the second ascending strand and fixed to the ascending profile.

15 Claims, 4 Drawing Sheets

(51) Int. Cl.
*B60J 1/12* (2006.01)
*B60J 5/04* (2006.01)
*B60J 10/74* (2016.01)
*B60J 10/78* (2016.01)
*B60J 10/79* (2016.01)
*B60J 10/80* (2016.01)
*B60J 10/88* (2016.01)

(52) U.S. Cl.
CPC .............. *B60J 5/0402* (2013.01); *B60J 10/74* (2016.02); *B60J 10/78* (2016.02); *B60J 10/79* (2016.02); *B60J 10/80* (2016.02); *B60J 10/88* (2016.02)

(58) Field of Classification Search
USPC .......... 49/372, 459, 475.1; 296/146.2, 146.3, 296/146.15, 146.16, 201
See application file for complete search history.

(56) References Cited

U.S. PATENT DOCUMENTS

| | | | | |
|---|---|---|---|---|
| 2011/0109009 | A1* | 5/2011 | Guellec | B60J 10/78 |
| | | | | 264/254 |
| 2016/0121701 | A1* | 5/2016 | Yoshida | B60J 1/10 |
| | | | | 49/372 |
| 2018/0141421 | A1* | 5/2018 | Blottiau | B60J 10/74 |
| 2018/0339576 | A1* | 11/2018 | Heppner | B60J 1/17 |

FOREIGN PATENT DOCUMENTS

| | | | | |
|---|---|---|---|---|
| FR | 2858950 A1 * | 2/2005 | ............. | B60J 10/30 |
| FR | 2858950 A1 | 2/2005 | | |
| WO | WO-2018109061 A1 * | 6/2018 | ............... | B60J 1/17 |

OTHER PUBLICATIONS

Rapport de Recherche Préliminaire mailed Aug. 26, 2019, issued in priority French Application No. 1872637, filed Dec. 10, 2018, 2 pages.

\* cited by examiner

VEHICLE DOOR OF THE FLUSH TYPE

TECHNICAL FIELD

Embodiments of this disclosure relate to a vehicle door of the "flush" type as well as a method of mounting this door.

BACKGROUND

A vehicle comprises doors, each of which usually comprises at least one window. As shown in FIG. 1, a door 10 comprises a lower part 10a and an upper part 10b which forms a frame 12 intended to surround the window 14. When this window 14 is movable, it can be moved from the upper part 10b to the lower part 10a. The frame 12 has a general inverted U-shape and comprises two ascending posts 12a, 12b connected by an upper rail 12c.

In this application, "ascending" refers to an element that has a generally elongated shape and extends substantially from bottom to top, or from top to bottom, for example vertically.

Most of the doors, which are intended to be installed on standard range vehicles, are of the "non-flush" type, i.e. their windows do not have their outer surfaces aligned with the outer surfaces of elements that extend at least partly around the windows, such as trims for example.

In this application, "trim" refers to any finishing element for a vehicle door, including appliqués, metal or metallized profiles, etc.

For a more luxurious range of vehicles, it is known to equip them with "flush" doors. This type of door has a movable window whose outer surface is aligned with the outer surfaces of surrounding elements. This alignment or flush gives an aesthetic aspect sought by customers.

SUMMARY

The present disclosure proposes an improvement to a "flush" door that facilitates its mounting and final rendering.

The disclosure proposes a vehicle door, comprising:

a mount comprising a lower part and an upper frame defining an opening, this upper frame comprising two ascending posts connected by an upper rail, an encapsulated fixed window module, the module having a general P-shape and comprising a fixed window mounted in a part of the opening, and an ascending profile extending along an ascending edge of the fixed window and extending from the opening to the lower part of the mount, a movable window capable of closing the remainder of the opening, this window comprising two ascending edges along which guides are fixed, a sliding joint having a general U-shape and comprising two ascending strands connected by an upper strand, the ascending strands having a general C-shape in cross-section and each comprising a longitudinal recess for receiving and guiding one of the guides, a first of the ascending strands extending along a first of the ascending posts, and a second of the ascending strands extending along the ascending profile, the fixed and movable windows comprising outer surfaces which are aligned with each other as well as with an outer surface of a first trim attached to the first ascending strand and fixed to the first ascending post, and an outer surface of a second trim attached to the second ascending strand and fixed to the ascending profile.

The disclosure thus proposes a door designed to give a "flush" appearance between the fixed and movable windows and between theses and trims of the door.

The door, according to the disclosure, may comprise one or more of the following characteristics, taken in isolation from each other or in combination with each other:

the ascending profile comprises a body made of rigid plastic and an overmolded coating that is configured to fix the plastic body to the fixed window, the body comprises a base for attachment to an inner surface of the fixed window, the overmolded coating comprising a first portion interposed between the base and the inner surface of the fixed window, and a second portion covering the ascending edge of the fixed window, the body comprises an ascending slot for receiving a tab of the second trim, the slot comprises extends in a plane substantially perpendicular to the fixed window and comprises a first side wall substantially aligned with the ascending edge or a portion of the overmolded coating, the slot comprises a second side wall comprising holes for elastically snap-fastening hooks carried by the tab, the second trim has a general L-shaped cross-section, the second trim comprises a wall extending parallel to and between the fixed and movable windows, the wall comprising the outer surface of the second trim, the wall of the second trim further comprises an inner surface on which an ascending rib substantially parallel to the ascending edge projects or recedes, the ascending strands each comprise an outer branch, an inner branch and a median branch for connecting the inner and outer branches, the outer branch of at least one of the ascending strands comprises a first ascending groove facing outwardly and in which is at least partially engaged an ascending rib of the corresponding trim, the outer branch of at least one of the ascending strands comprises a second ascending groove facing inwardly and in which at least part of at least one hook of one of the guides can be engaged, the upper strand comprises a U-shaped clip for attachment to the upper rail, the upper strand comprises an extension extending around a part of the fixed window and along one of the ascending posts, at least one of the first and second trims is made of a single piece from two materials, the sliding joint is monobloc.

The present disclosure also concerns a vehicle, comprising at least one door as described above.

This disclosure also concerns a method for mounting a door as described above, wherein it comprises the steps of:

a) mounting the encapsulated fixed window module on the mount, b) mounting the sliding joint, c) mounting the movable window, and d) mounting the first and second trims.

Preferably, in step b), the upper strand of the sliding joint is mounted on the upper rail by translation of this upper strand in a direction substantially perpendicular to a plane of the upper frame of the door mount and oriented towards the inside of the door.

Advantageously, the second trim is fixed by elastic snap-fastening to the ascending profile.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description and with reference to the drawings, a three-dimensional reference mark is used, the axis X of which is horizontal and oriented in the direction of travel of the vehicle, the axis Y is horizontal and oriented towards the inside of the vehicle, and the axis Z is vertical and oriented ascending. The terms "front" and "rear" refer to the front and rear of the vehicle in relation to the axis X. The terms "inner" and "outer" refer to the interior and exterior of the vehicle in relation to the axis Y. Finally, the terms "inferior" or "lower" and "exterior" or "upper" refer to the lower or upper part of the vehicle in relation to the axis Z.

Figure 1:
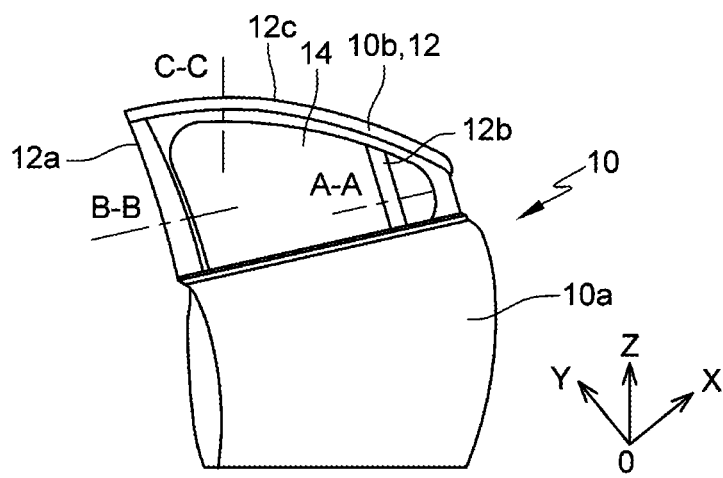
FIG. 1 is a schematic perspective view of a vehicle door.
Figure 2:
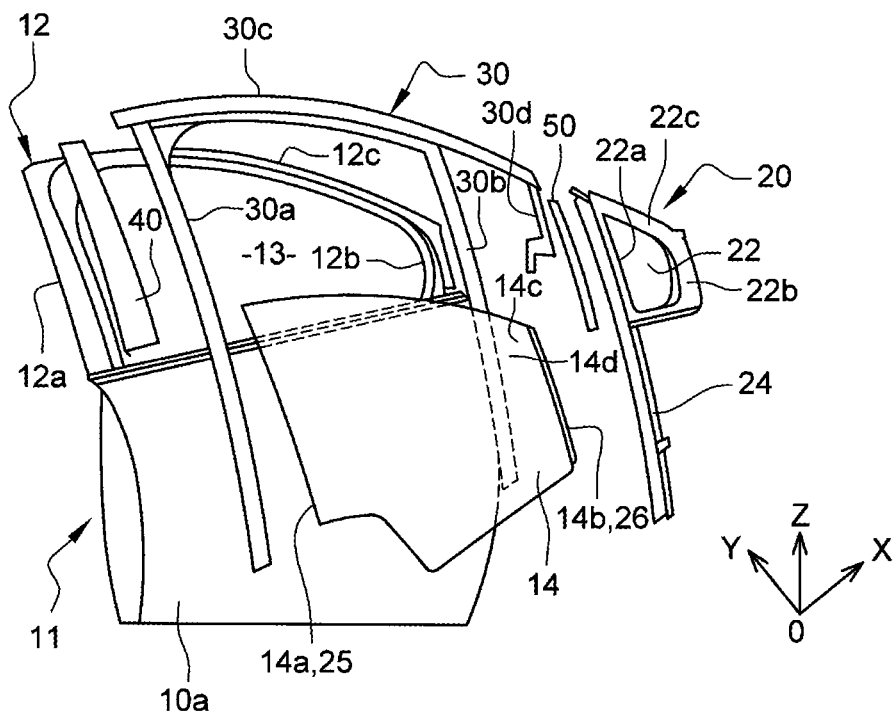
FIG. 2 is a schematic exploded perspective view of the door in FIG. 1.
Figure 3:
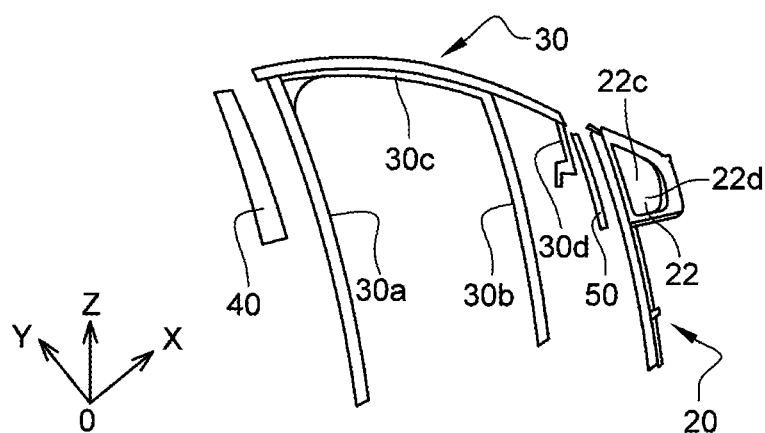
FIG. 3 is a schematic perspective view of some elements of the door in FIG. 1.

FIGS. 1 to 3 show a door 10 of a vehicle, which comprises a mount 11, an encapsulated fixed window module 20, a movable window 14, a sliding joint 30, and trims 40, 50. In the example shown, the door 10 is a front vehicle door.

The mount 11 comprises a lower part 10a and an upper frame 12 defining an opening 13, this upper frame comprising two ascending posts, respectively rear 12a and front 12b, connected by an upper rail 12c.

The module 20 has a general P-shape and comprises a fixed window 22 mounted in a part, here in front of the opening 13, and an ascending profile 24 extending along an ascending edge, here in rear 22a, of the fixed window 22 and extending along the opening 13 and below a belt line in the mount. It therefore extends at least partially into the lower part 20a of the mount 11. The fixed window 22 comprises a front ascending edge 22b extending along the rear ascending post [[12b]] 12a. The inner and outer surfaces of the window 22 are referred to as references 22c and 22d respectively.

The movable window 14 is able to close the rest of the opening 13, behind the fixed window 22. The window 14 comprises two ascending edges, respectively rear 14a and front 14b, along which guides 25, 26 are fixed. Each guide 25, 26 is elongated in shape and is fixed by any appropriate technique and for example by gluing to an inner surface 14c of the window 14c. The outer surface of window 14 is referred to as reference 14d.

The sliding joint 30 has a general inverted U-shape and has two ascending strands, rear 30a and front 30b respectively, connected by an upper strand 30c. The rear strand 30a extends along the rear ascending post 12a, and the front strand 30b extends along the profile 24, the upper strand 30c extends forward and is connected at its front end to an additional ascending strand 30d. The extension of the strand 30c extends along the upper edge 22e of the window 22 and a front part of the upper rail 12c. The additional strand 30d extends along the front edge 22b of the fixed window 22 and the front ascending post 12b.

A first trim, rear 40, is attached to the rear strand 30a and fixed to the rear ascending post 12a. A second trim, front 50, is attached to the front strand 30b and fixed to the profile 24.

Figure 4:
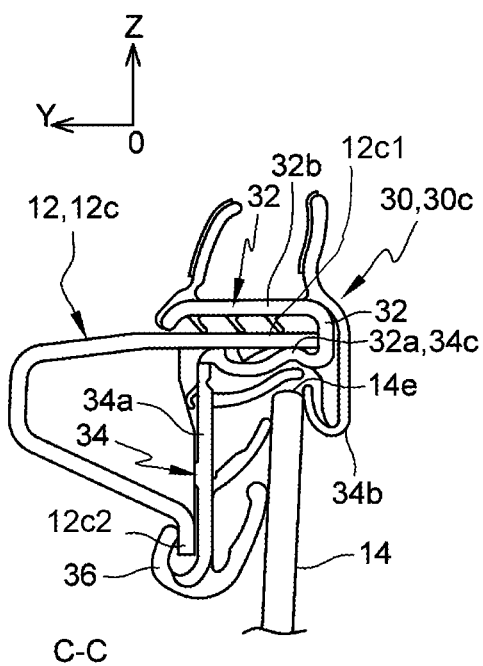
FIG. 4 is a schematic cross-sectional view according to line C-C in FIG. 1.
Figure 5:
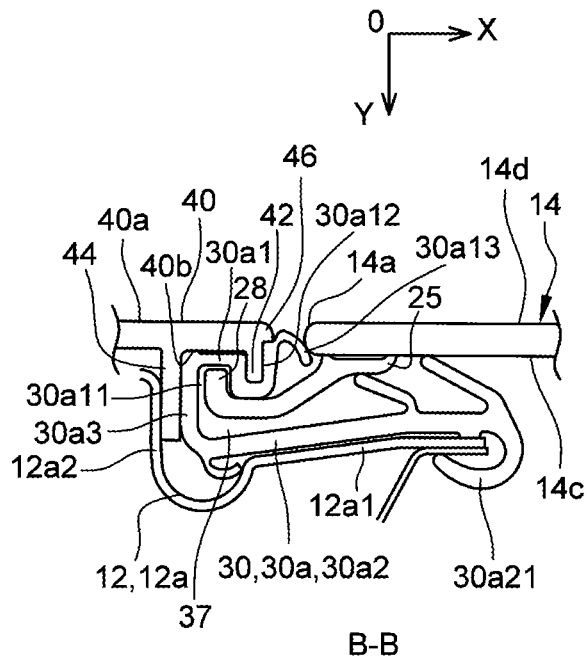
FIG. 5 is a schematic cross-sectional view according to line B-B in FIG. 1.
Figure 6:
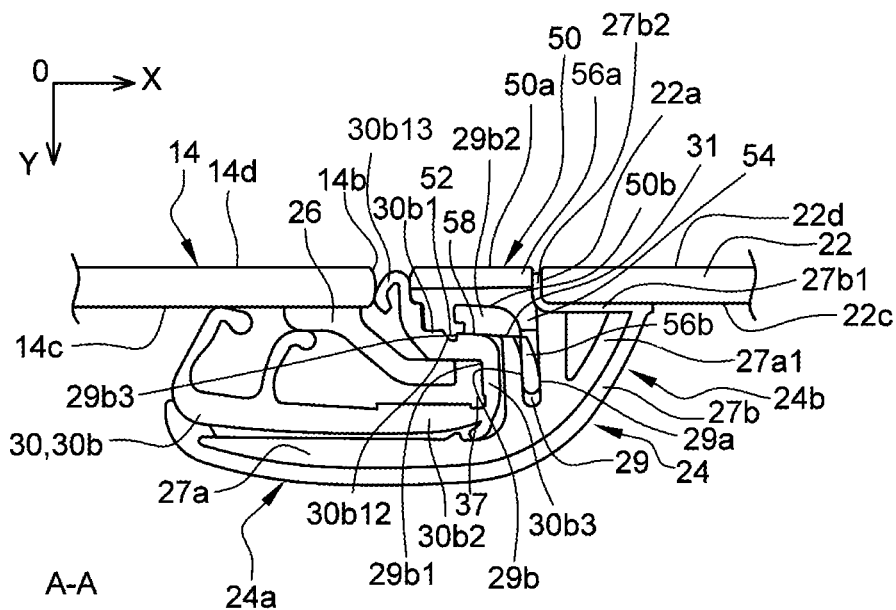
FIG. 6 is a schematic cross-sectional view according to line A-A in FIG. 1.

The door 10 is of the "flush" type described above and FIGS. 6, 5 and 4 show cross-sectional views along lines A-A, B-B and C-C respectively in FIG. 1. FIG. 4 therefore shows a cross-sectional view of the upper strand 30c and the upper rail 12c. FIG. 5 shows a cross-sectional view of the rear ascending post 12a, rear strand 30a and rear trim 40, and FIG. 6 shows a cross-sectional view of the front strand 30b, front trim 50 and profile 24.

With reference to FIG. 4, it can be seen that the upper rail 12c comprises a folded sheet metal with an upper longitudinal edge 12c1 engaged in a U-section clip 32 of the upper strand 30c. The upper longitudinal edge 12c1 faces outwards and the clip 32 is mounted on this edge by translation from outwards to inwards, until the upper longitudinal edge 12c1 is engaged at the bottom of the opening of the clip, which is therefore facing inwardly. The clip 32 comprises two side walls 32a, 32b, lower and upper respectively, connected to each other by an outer median wall 32c.

In addition to the clip 32, the upper strand 30c comprises a U-shaped portion 34 with a downwardly oriented opening to receive the upper edge 14e of the movable window 14. The portion 34 comprises two side walls 34a, 34b, respectively inner and outer, and connected to each other by an upper median wall 34c. The wall 34a comprises at its lower end a tab 36 for hanging on a lower longitudinal edge 12c2 of the rail 12c.

In the example shown, the clip 32 and portion 34 are combined to limit their size, the walls 32a and 34c are merged here.

The upper strand 30c comprises several sealing lips cooperating with the window 14, the rail 12c and the vehicle body.

With reference to FIG. 5, the guide 25 is fixed to the inner surface 14c of the window 14, along its rear ascending edge 14a. The guide 25 is elongated in shape and extends along the axis X beyond the edge 14a to be engaged in a longitudinal recess 37 of the strand 30a. In addition, the guide 25 may comprise at its rear end, opposite to the window 14, at least one guide and/or retaining hook 28 which faces outwards.

The rear strand 30a has a general C-shaped section to define the longitudinal recess 37 of the guide 25. The strand 30a comprises two branches, outer 30a1 and inner 30a2 respectively, connected together by a median branch 30a3.

The outer branch 30a1 has a general S-shape cross-section and comprises an ascending groove 30a11 facing inwardly and intended to receive the hook(s) 28 of the guide 25, and an ascending groove 30a12 facing outwards to receive an ascending rib 42 of the trim 40. The groove 30a11 is located between the median branch 30a3 and the groove 30a12. In addition, the branch 30a comprises at its free front end an ascending sealing lip 30a13 occupying the space between the trim 40 and the edge 14a of the window 14, and supported on this edge 14a. The strand 30 may comprise other sealing lips intended to cooperate with the window 14, guide 25, post 12a, etc.

The inner branch 30a2 is supported inwardly on a front part 12a1 of the rear ascending post 12a1 of which a rear part 12a2 extends outwards, behind the branch 30a3, to define with the latter a space for engaging a tab 44 of the trim 40.

The inner branch 30a2 comprises at its front end a tab 30a21 for attachment to a longitudinal front edge of the front part 12a1.

The trim 40 comprises an ascending wall 46 parallel to the axis X and comprising an inner surface 40b and an outer surface 40a which is aligned with the outer surface 14d of the window 14.

The rib 42 and the tab 44, described above, protrude from the inner surface 40b of the wall. They are substantially parallel and the rib 42 is located in front of the tab 44, near the ascending front edge of the wall. The rib 42 has a dimension along the axis Y that is smaller than that of the tab 44. This rib 42 is fitted tightly into the groove 30a12 and allows the strand 30a to be precisely positioned and retained. The tab 44 is also tightly fitted between the rear part 12a2 and the branch 30a3.

With reference to FIG. 6, the guide 26 is fixed to the inner surface 14c of the window 14, along its front ascending edge 14b. The guide 26 is elongated in shape and extends along the axis X beyond the edge 14b to be engaged in the longitudinal recess 37 of the front strand 30b.

The front strand 30b has a general C-shaped section to define the longitudinal recess 37 for receiving the guide 26. The front strand 30b comprises two branches, outer 30b1 and inner 30b2 respectively, connected together by a median branch 30b3.

The outer branch 30b1 comprises an ascending groove 30b12 facing outwards to receive a pin of an ascending rib 52 of the trim 50. In addition, the branch 30a comprises at its free rear end an ascending sealing lip 30b13 occupying the space between the trim 50 and the edge 14b of the window 14, and supported on this edge 14b. The strand 30 may comprise other sealing lips to cooperate with the window 14, the guide 26, the front ascending post 12b, etc.

The inner branch 30b2 is supported inwardly on a rear part 24a of the profile 24 of which a front part 24b is fixed to the fixed window 22.

The profile 24 has a general L-shape and comprises the rear part 24a which is substantially parallel to the axis X and the front part 24a which extends outwards, parallel to the axis Y from the front end of the part 24a.

The profile 24 comprises of a body 27a made of rigid plastic and an overmolded coating 27b that is configured to fix the plastic body to the fixed window 14. The body 27a comprises a base 27a1 for attachment to the inner surface 22c of the fixed window 22. The overmolded coating 27b comprises a first portion 27b1 interposed between the base 27a1 and the inner surface 22c of the fixed window 22, and a second portion 27b2 covering the ascending edge 22a of the fixed window 22.

The body 27a also comprises an ascending slot 29 for receiving a tab 54 of the trim 50. The slot 29 extends parallel to the axis Y and comprises a first side wall, in this case front 29a, substantially aligned with the edge 22a or the portion 27b2.

The slot 29 comprises a second side wall, in this case rear wall 29b, with holes 31 intended to receive elastically-deformable hooks 56b carried by the tab 54.

The side wall 29b of the slot 29 is supported here by a wall with L-shaped section of the body, a part 29b1 of this wall extending parallel to the axis Y and comprising the holes 31, and a part 29b2 extending parallel to the axis X, from the outer end of the wall 29b1 to the rear. This part 29b2 comprises an ascending rib 29b3 facing rearward and engaged in an ascending notch 58 in a shape complementary to the rib 52 of the trim 50.

The trim 50 comprises an ascending wall 56a parallel to the axis X and comprising an inner surface 50b and an outer surface 50a which is aligned with the outer surfaces 14d, 22d of the windows 14, 22. The rib 52 and the tab 54 protrude from the inner surface 50b of the wall 56a. The above-mentioned pin protrudes inwardly on the inner end of the rib 52, and the notch 58 is formed on a rear face of this rib 52.

It is understood that the trim 50 can be fixed to the profile 24 by a double elastic snap-fastening, the one of the tab 54 in the slot 29 and the one of the rib 52 at the rib 29b3 and the groove 30b12.

Figure 7:
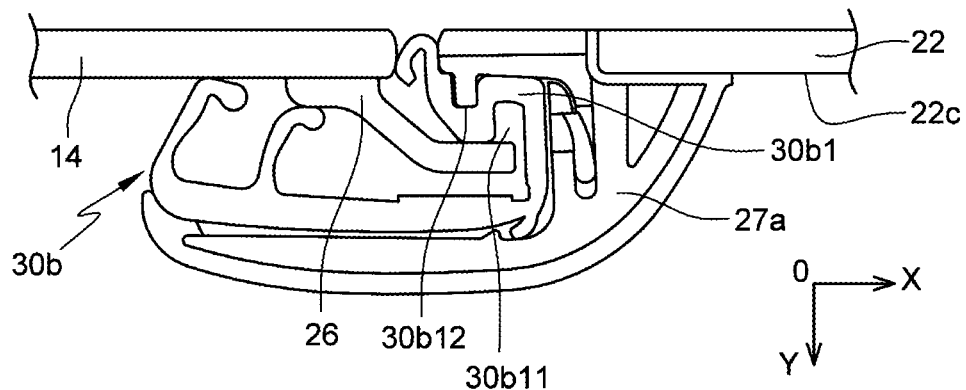
FIG. 7 is a similar view to that of FIG. 6 and shows a variant of embodiment.
Figure 8:
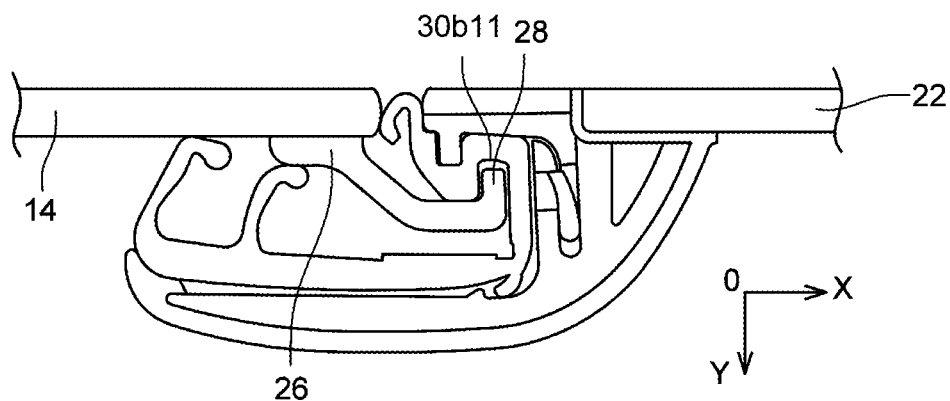
FIG. 8 is a similar view to that of FIG. 6 and shows a variant of embodiment.

FIGS. 7 and 8 illustrate variant embodiments of the front strand 30b.

In the variant of FIG. 7, the body 27a does not comprise a part 29b2. The outer branch 30b1 of the front strand 30b has an S-shaped cross-section and comprises an ascending groove 30b11 facing inwardly, and an ascending groove 30b12 facing outwards to receive the rib 52 of the trim 50. The groove 30b11 is located between the median branch 30b3 and the groove 30b12. The rib 52 of the trim 50 comprise no pin or groove 58.

The variant embodiment of FIG. 8 differs from that of FIG. 7 in that the guide 26 comprises at least one hook 28 intended to be engaged in the groove 30b11 of the front strand 30b to ensure correct positioning and retention of the window 14.

Figure 9:
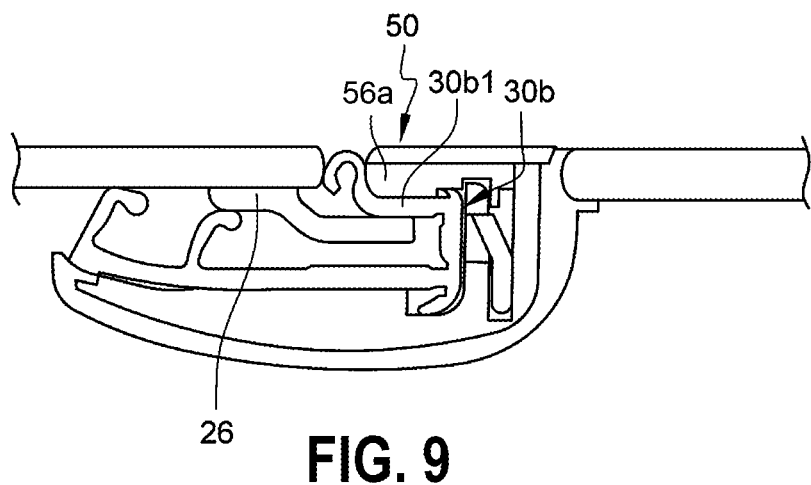
FIG. 9 is a similar view to that of FIG. 6 and shows a variant of embodiment.

The variant embodiment in FIG. 9 differs from that in FIGS. 7 and 8 in that the outer branch 30b1 of the front strand 30b comprises neither a groove 30b11 nor a groove 30b12. This branch 30b1 is substantially flat and interposed between the guide 26 and the ascending wall 56a of the trim 50.

Preferably, when one window 14 is equipped with a guide 25 or 26 which comprises a hook 28, the other guide 26 or 25 of this window does not comprise such a hook, this in order to facilitate the mounting and sliding of the window 14 in the door 10 and the sliding joint 30.

The disclosure also concerns a method for mounting the door 10, which comprises (with reference to FIG. 2 for example) the steps of:

a) mounting the encapsulated fixed window module 20 on the mount 11,
b) mounting the sliding joint 30,
c) mounting the movable window 14, and
d) mounting the trims 40, 50.

Preferably, in step b), the upper strand 30c of the sliding joint 30 is mounted on the upper rail 12c by translating this upper strand in a direction substantially perpendicular to a plane of the upper frame of the door mount and oriented towards the inside of the door. This direction is schematically represented by two parallel arrows in the drawing. Advantageously, at least the second trim 50 is fixed by elastic snap-fastening to the ascending profile 24.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B." The phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A vehicle door, comprising:
   a mount comprising a lower part and an upper frame defining an opening, the upper frame comprising two ascending posts connected by an upper rail;
   an encapsulated fixed window module, said module having a general P-shape and comprising a fixed window mounted in a part of said opening, and an ascending profile extending along an ascending edge of the fixed window and extending from the opening to the lower part of the mount;
   a movable window configured to close the remainder of said opening, this window comprising two ascending edges along which guides are fixed; and
   a sliding joint having a general U-shape and comprising two ascending strands connected by an upper strand, the ascending strands having a general C-shape in cross-section and each comprising a longitudinal recess for receiving and guiding one of said guides, a first of the ascending strands extending along a first of the ascending posts, and a second of the ascending strands extending along said ascending profile;
   a first covering trim positioned onto the first ascending strand and fixed to said first ascending post; and
   a second covering trim positioned onto the second ascending strand and fixed to said ascending profile,
   wherein the fixed and movable windows comprise outer surfaces which are aligned with each other as well and with outer surfaces of first and second covering trims,
   wherein said ascending profile comprises a body made of rigid plastic and an overmolded coating which is configured to fix the plastic body to the fixed window,
   wherein said body comprises an ascending slot for receiving a tab of said second covering trim,
   and wherein said slot extends in a plane substantially perpendicular to said fixed window and comprises a first side wall substantially aligned with said ascending edge.

2. The vehicle door according to claim 1, wherein said body comprises a base for attachment to an inner surface of the fixed window, said overmolded coating comprising a first portion interposed between the base and the inner surface of the fixed window, and a second portion covering said ascending edge of the fixed window.

3. The vehicle door according to claim 1, wherein said slot comprises a second side wall comprising holes for receiving elastically-deformable hooks carried by said tab.

4. The vehicle door according to claim 1, wherein said second covering trim comprises a wall extending parallel to and between the fixed and movable windows, said wall comprising said outer surface of the second covering trim.

5. The vehicle door according to the claim 4, wherein the wall of said second covering trim further comprises an inner surface on which an ascending rib substantially parallel to said ascending edge projects or recedes.

6. The vehicle door according to claim 1, wherein said ascending strands each comprise an outer branch, an inner branch and a median branch for connecting the inner and outer branches.

7. The vehicle door according to claim 6, wherein the outer branch of at least one of said ascending strands comprises a first ascending groove facing outwardly and in which is at least partially engaged an ascending rib of said corresponding trim.

8. The vehicle door according to claim 6, wherein the outer branch of at least one of said ascending strands comprises a second ascending groove facing inwardly and into which at least part of at least one hook of one of said guides can be engaged.

9. The vehicle door according to claim 1, wherein said upper strand comprises a U-shaped clip for attachment to said upper rail.

10. The vehicle door according to claim 1, wherein said upper strand comprises a portion extending around a part of the fixed window.

11. The vehicle door according to claim 1, wherein at least one of said first and second trims is made of a single piece from two materials.

12. A vehicle, comprising at least one door according to claim 1.

13. A method of mounting a door according to claim 1, wherein the method comprises the following steps:
   a) mounting the encapsulated fixed window module on the mount;
   b) mounting the sliding joint;
   c) mounting the movable window; and
   d) mounting the first and second covering trims,
   wherein the second covering trim is snap fitted to said ascending profile.

14. The method according to claim 13, wherein, in step b), the upper strand of the sliding joint is mounted on said upper rail by a translation of this upper strand in a direction substantially perpendicular to a plane of the upper mount of the door frame and oriented towards the inside of the door.

15. A vehicle door, comprising:
   a mount comprising a lower part and an upper frame defining an opening, the
   upper frame comprising two ascending posts connected by an upper rail;
   an encapsulated fixed window module, said module having a general P-shape and comprising a fixed window mounted in a part of said opening, and an ascending profile extending along an ascending edge of the fixed window and extending from the opening to the lower part of the mount;

a movable window configured to close the remainder of said opening, this window comprising two ascending edges along which guides are fixed; and a sliding joint having a general U-shape and comprising two ascending strands connected by an upper strand, the ascending strands having a general C-shape in cross-section and each comprising a longitudinal recess for receiving and guiding one of said guides, a first of the ascending strands extending along a first of the ascending posts, and a second of the ascending strands extending along said ascending profile;

a first covering trim positioned onto the first ascending strand and fixed to said first ascending post; and a second covering trim positioned onto the second ascending strand and fixed to said ascending profile, wherein the fixed and movable windows comprise outer surfaces which are aligned with each other as well and with outer surfaces of first and second covering trims, wherein said ascending profile comprises a body made of rigid plastic and an overmolded coating which is configured to fix the plastic body to the fixed window, wherein said body comprises a base for attachment to an inner surface of the fixed window, said overmolded coating comprising a first portion interposed between the base and the inner surface of the fixed window, and a second portion covering said ascending edge of the fixed window, wherein said body comprises an ascending slot for receiving a tab of said second covering trim, and wherein said slot extends in a plane substantially perpendicular to said fixed window and comprises a first side wall substantially aligned with said ascending edge or a portion of said overmolded coating.

* * * * *